(12) United States Patent
Myers et al.

(10) Patent No.: US 6,357,927 B1
(45) Date of Patent: Mar. 19, 2002

(54) END PLAY PRELOAD ADJUSTING ASSEMBLY FOR BEARINGS

(75) Inventors: Leslie Dean Myers; Gary Peter Doyle, both of Fort Wayne, IN (US)

(73) Assignee: Spicer Technology, Inc., Fort Wayne, IN (US)

( * ) Notice: Subject to any disclaimer, the term of this patent is extended or adjusted under 35 U.S.C. 154(b) by 0 days.

(21) Appl. No.: 09/644,581

(22) Filed: Aug. 24, 2000

(51) Int. Cl.$^7$ ............................................... F16C 19/36
(52) U.S. Cl. ...................................................... 384/563
(58) Field of Search ................................ 384/563, 584, 384/517, 518, 540

(56) References Cited

U.S. PATENT DOCUMENTS

| | | |
|---|---|---|
| 1,614,992 A | 1/1927 | Roberts |
| 1,815,689 A | 7/1931 | Wiedmainer |
| 2,546,969 A | 4/1951 | Buckendale |

*Primary Examiner*—Lenard A. Footland
(74) *Attorney, Agent, or Firm*—Liniak, Berenato, Longacre & White

(57) ABSTRACT

An assembly to effect adjustments to the end play, or preloading, of a bearing set. The adjusting assembly utilizes a threaded bearing cup body and a correspondingly threaded adjusting ring. The bearing cup body abuts the outer race of the bearing and the adjusting ring is threaded onto the bearing cup body and abuts a fixed or stationary housing surface. The adjusting ring is rotated to adjust bearing preload and provide proper spacing. The bearing cap is then placed to lock the bearing adjusting assembly in place.

8 Claims, 2 Drawing Sheets

END PLAY PRELOAD ADJUSTING ASSEMBLY FOR BEARINGS

BACKGROUND OF THE INVENTION

1. Field of the Invention

The present invention relates to bearing mounts. More particularly, the present invention relates to a simplified adjustment assembly which interacts between a bearing assembly and the housing within which the bearing assembly is supported. Specifically, the present invention relates to an assembly by which to effect incremental adjustments to the axial end play of, or the preload on, the outer race of a bearing assembly, either alone or in a set.

2. Description of Related Art

Even with journal arrangements for which thrust loading is not reasonably anticipated, and within which cylindrical bearings are appropriate to support radial loading, it is customary to utilize some structure by which to effect axial retention of the bearings that rotatably support a shaft, or the like. This is done so that should the shaft, even unexpectedly, apply a reasonable thrust load on the bearing, the bearing will remain seated within the housing. When the environment in which the journal arrangement is employed is such that both radial and thrust loading would be expected, one would generally consider the use of tapered bearing sets inasmuch as they effect excellent rotational support for a shaft subjected to such loading and without impairing rotation of the shaft. However, other alternatives are often employed because of the difficulties heretofore experienced in adjusting the axial end play of, or the preload on, the races which support the rollers in a tapered bearing assembly.

Thrust loading is transferred by the individual bearing assemblies in a tapered bearing set from the shaft to the journal box or housing, within which the bearings of the bearing set are supported. Generally, the inner race of each bearing assembly abuts a shoulder presented from the rotatable shaft or differential case. The outer race similarly abuts an opposed shoulder presented from the housing in which the bearing is supported. Obviously, the structure, which presents the opposed shoulders between which the bearing set is captured, must be such as to permit assembly of the shaft and both bearing assemblies into the housing. Moreover, even if opposed, rigid shoulders could be provided, such an arrangement would not allow for any variation or adjustment in the end play of, or the preloading applied to, the bearing set.

To facilitate assembly, some arrangements (such as those wherein the hub of an axially elongated shaft is supported by inboard and outboard bearing assemblies) utilize the aforesaid configuration for the inboard bearing—i.e., the inner race abuts a shoulder on the shaft and the outer race abuts a shoulder on the housing—but reverses the arrangement for the outboard bearing. That is, the outer race of the outboard bearing would abut a shoulder on the housing and the inner race would abut a shoulder means presented from the shaft. In this latter arrangement, adjustment of the preload and the end play has been achieved by using a nut threaded onto the shaft to drive a washer which serves as the shoulder means. In this configuration, the washer abuts the inner race and the nut can be tightened or loosened to move the washer and thereby adjust the preload and end play.

It is, however, difficult to achieve and maintain incremental adjustments of the small magnitude desired by using a nut threaded onto the end of the shaft. Certainly, such nuts are often crenellated to permit a safety wire or clip to be inserted through a diametric bore in the shaft in order to secure the selected position of the nut. However, the magnitude of the adjustments permitted by the aforesaid arrangement is limited to a function of the thread pitch and the number of crenellations as well as their angular disposition.

To accomplish incremental adjustments of a small or fine magnitude, a variety of arrangements have been developed which utilize shims interposed between one race of the bearing set and a bearing retainer. The shims utilized by such prior art assemblies are available in a plurality of dimensions so that the selection of appropriately sized shims will generally achieve the desired end play or preloading. However, the installation of a typical shim assembly generally requires a rather complicated series of steps. For example, one must normally measure the gap between one race of the bearing assembly and the bearing retainer to determine the size of the shim or shims required, and the shim or a combination of shims must then be selected. The selected shim(s) must then be appropriately inserted between the selected race of the bearing assembly and the bearing retainer. The installation is not concluded until a final measurement has been made to verify that the proper end play and preloading has been achieved.

The installation of prior known shim assemblies is, therefore, a relatively complicated process for which considerable expertise is required, and for which shims must be available in a wide variety of sizes in order for the desired end play or preloading to be effected.

In the field of differential assemblies, the assembly process often requires the carrier to be spread or stretched to facilitate assembly of differential components. The process and required spreader tool substantially increases the assembly time and cost.

Another form of a prior art bearing adjusting assembly employs opposed cams or ramps. The use of cams or ramps allows for a wide range in the amount of end play or preloading adjustment available and reduces the number of components which must be stocked. However, the locking means heretofore employed in conjunction with cams or ramps to secure the selected adjustment, generally comprises a plurality of bolts that are receivable within threaded bores. The need to provide threaded bores, however, creates a problem in that while the aforementioned cams or ramps will allow for an infinite array of settings, discrete placement of threaded bores to receive the bolts severely restricts usage of the array to that permitted by the particular placement of the bores.

SUMMARY OF THE INVENTION

It is, therefore, a primary object of the present invention to provide a simplified assembly by which to effect incremental adjustments to the end play of, and the preload on, a bearing set.

It is another object of the present invention to provide an adjusting assembly, as above, which incorporates a relatively uncomplicated arrangement by which to secure the selected end play and preload, by moving the bearing race upon which the adjusting assembly acts through dimensional increments.

It is a further object of the present invention to provide an adjusting assembly, as above, which does not require stocking a plurality of different size shims.

It is still another object of the present invention to provide an adjusting assembly, as above, which assures that the selected end play and preloading will be maintained, and which can thereafter be further adjusted as necessary or desired, with relative ease.

It is yet another object of the present invention to provide an adjusting assembly which permits the desired preload for a bearing set to be exceeded in order to seat the bearing set correctly.

These and other objects of the invention, as well as the advantages thereof over existing and prior art forms which will be apparent in view of the following detailed specification, are accomplished by means hereinafter described and claimed.

In general, an assembly embodying the concepts of the present invention allows an engineer, mechanic, or the entity repairing or originally assembling a bearing set within a support housing, to effect incremental adjustments to the preloading on the bearing set.

In a preferred embodiment of the invention the adjusting assembly utilizes an internally threaded bearing cup body and an externally threaded adjusting ring. The bearing cup body abuts the outer race of the bearing and the adjusting ring is threaded onto the bearing cup body and abuts a fixed or stationary housing surface. The adjusting ring is rotated to adjust bearing preload and provide proper spacing. The bearing cap is then placed to lock the bearing adjusting assembly in place.

DESCRIPTION OF A PREFERRED EMBODIMENT

One representative form of an adjusting assembly embodying the concepts of the present invention is designated generally by the numeral 1 on the accompanying drawings showing a differential assembly. It is understood that the present invention is not limited to this environment but instead provides an adjustment assembly suitable for a variety of systems employing a tapered bearing assembly.

Figure 1:
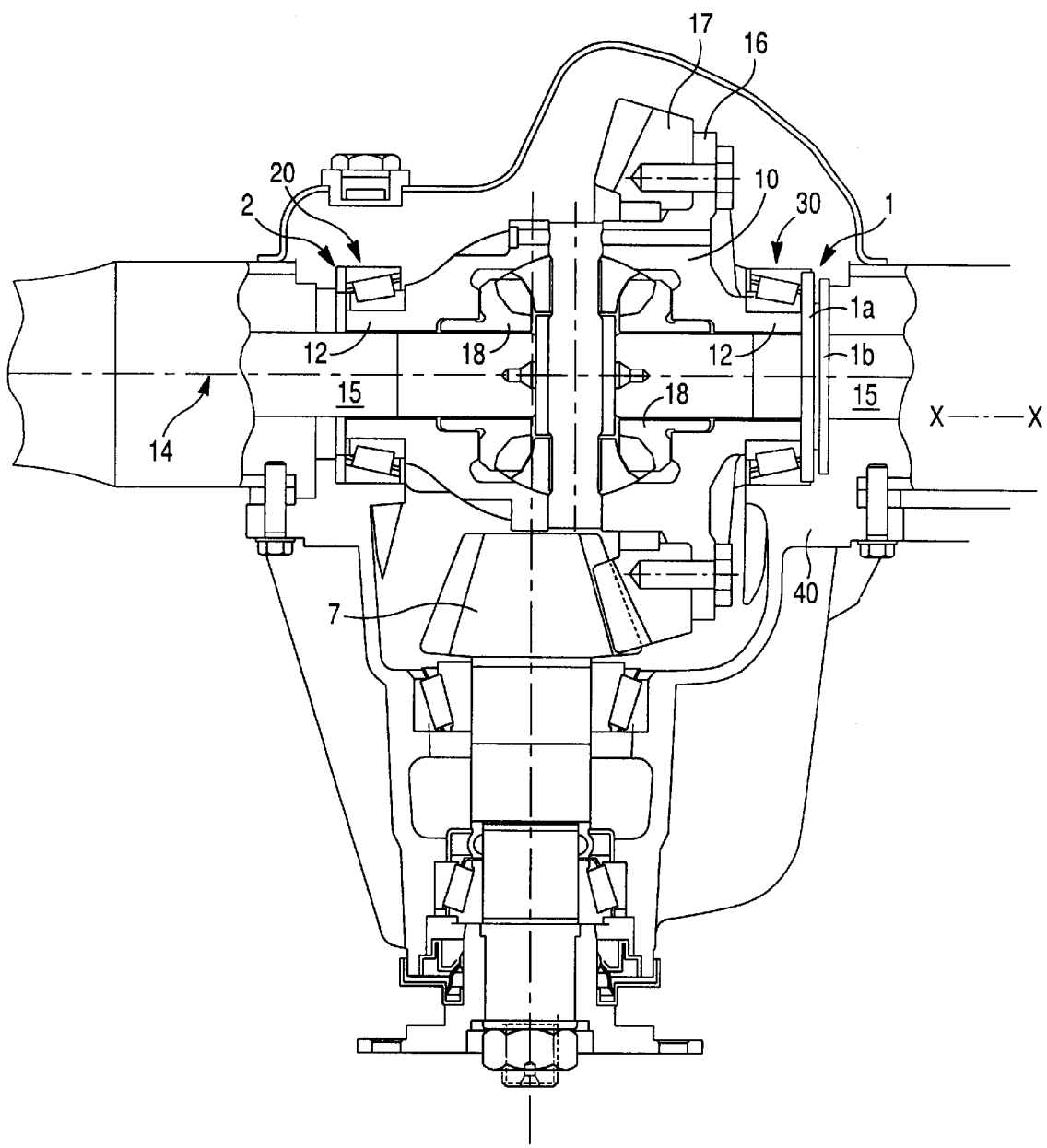
FIG. 1 is a longitudinal cross section taken substantially along the axis of axle shafts operative engaging a differential assembly, one side of which incorporates the structure of an exemplary form of adjustment assembly embodying the concepts of the present invention and the other side of which incorporates conventional shims/spacers.

FIG. 1 of the drawings illustrates a differential assembly in accordance with the present invention comprising a differential case 10 having opposing axial spigots 12 at each end thereof. The spigots 12 are provided to mount the case 10 for rotation about an axis 14 on rolling bearings 20, 30 supported by a differential carrier 40. The differential case 10 has an external flange 16 with circumferentially spaced holes for attachment by bolts to a ring gear 17. The ring gear 17 meshes with an input pinion 7 connected to a driveline of a motor vehicle (not shown).

The differential case 10 forms a hollow compartment in its interior, within which a pair of bevel side gears 18 is disposed. The side gears 18 are supported for rotation about the axis 14 relative to the case 10. The side gears 18 have respective splined bores for a torque transmitting connection to axle shafts 15 extending into the case 10 through the spigots 12.

This invention is directed primarily to a bearing preload adjusting assembly to adjust the position and preload of the bearings 20, 30 disposed between the differential case 10 and the differential carrier 40. FIGS. 1 depicts, on the one hand (right side), the adjusting assembly 1 of the present invention in conjunction with the bearing 30 and depicts, on the other hand (left side), the conventional shim/spacer assembly 2 common in the prior art in conjunction with the bearing 20.

The outer race 30a of the roller bearing 30 is mounted for axial adjustment within coaxial bores in the differential carrier 40, which project into the housing center. The adjusting assembly comprises a bearing cup body 1a and an adjusting ring 1b. In the preferred embodiment, the adjusting ring 1b threadingly engages the bearing cup body 1a to thereby provide an expandable or telescoping bearing cup. The adjusting assembly is interposed between the outer race 30 of the bearing 30 and an inner bearing surface of the stationary differential carrier 40. As the relative width of the adjusting assembly 1 (in direction x—x of FIG. 1) is increased, an increased load is applied to the outer race 30a of the bearing 30. When the adjusting assembly 1 achieves the proper axial displacement and bearing preload, a bearing cap (not shown) is then placed to lock the adjusting assembly in place. Suitable locking pawls 1 g (e.g., crenations, pawls, tangs, etc.) may be provided on the adjusting ring to enhance the locking effect when desire adjustment has been achieved. In environments where a bearing cap is not desirable, other suitable means (e.g., lock pin, bolts, adhesive, etc) may be employed to secure the adjusting assembly 1 in proper position.

Figure 2:
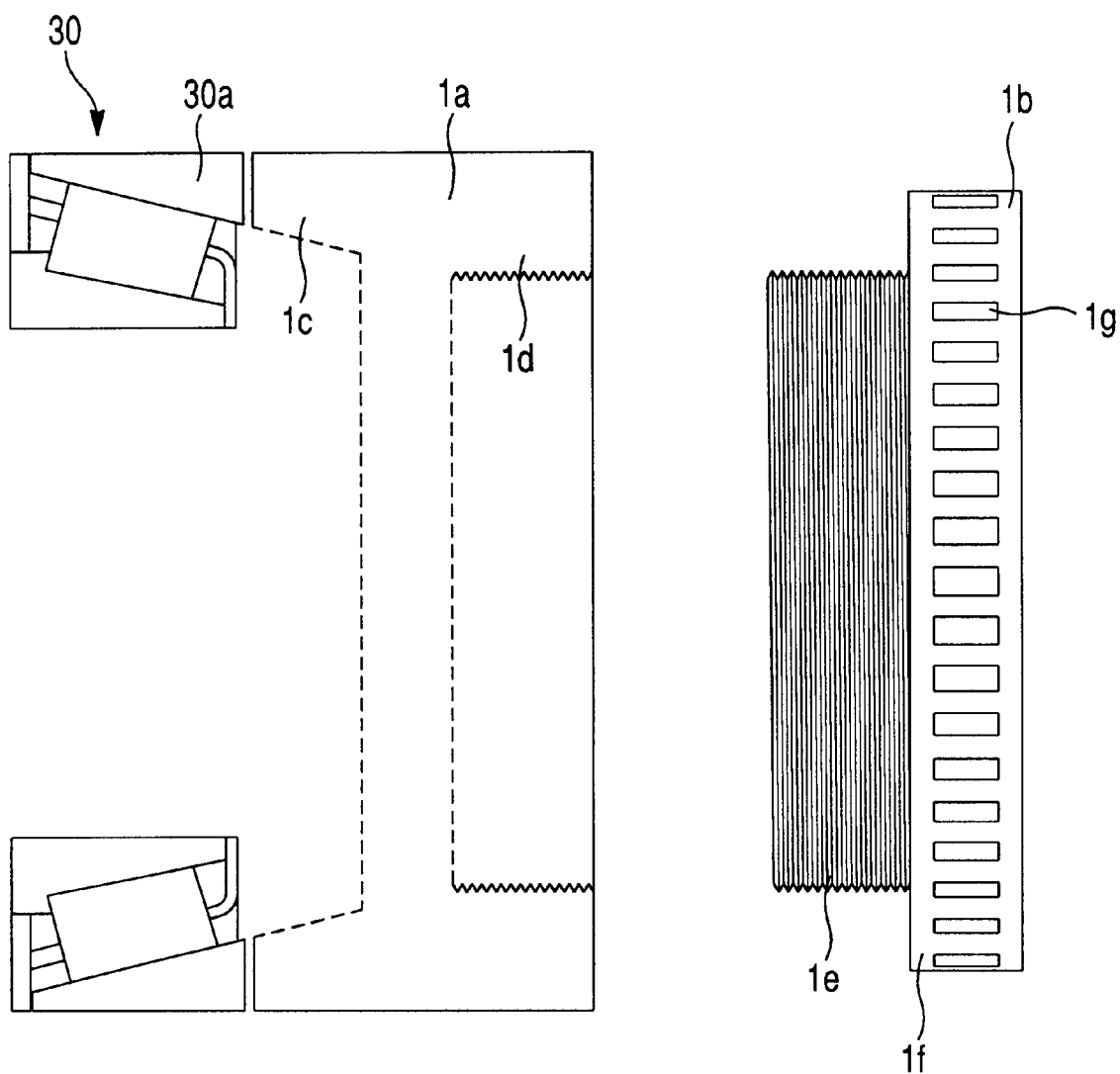
FIG. 2 is an enlarged cross section view of the bearing adjusting assembly depicted in conjunction with the bearing assembly, and in the same relative disposition, as depicted in FIG. 1.

With reference to FIG. 2 showing a schematic representation of the adjusting assembly in conjunction with the bearing 30, the bearing cup body is formed with an engaging hub portion 1c and a threaded bore 1d while the adjusting ring is formed with a threaded screw portion 1e and a main hub portion 1f. It is noted that in the preferred embodiment the main hub portion of the adjusting ring 1b has a slightly smaller outer circumference to permit rotation in the carrier or other appropriate housing.

Tapered bearings, either individually or in a set, are employed in many applications where both radial and thrust loading may be applied. According to the concept of the present invention, the bearing assemblies are axially restricted by means of at least one fixed shoulder and an effective movable shoulder provided by the adjusting assembly 1.

The present invention will act to replace the prior art shim pack, cover and seal used to adjust tapered bearing assemblies. The bearing cap of the present invention will secure the rotatable adjusting ring 1b in position with no possibility of creep while still providing the fine adjustments to the preloading and end play of an individual tapered bearing assembly, or a tapered bearing set 30.

It should be apparent that a system embodying the concepts of the present invention effectively secures the desired end play for a tapered bearing. And, it should also be apparent to one skilled in the art, that the size, shape and dimensions of the bearing cup body 1a and adjusting ring 1b, as well as the size and number of the locking pawls 1f and the locking member or bearing cap, may be varied to suitably fit any environment and to provide the particular axial translation of the bearing cup body 1a in response to a predetermined angular rotation of the adjusting ring 1b without departing from the spirit of the present invention.

As should now be apparent, the present invention not only provides a simplified assembly by which to effect incremental adjustments to the end play and preload of a bearing but also accomplishes the other objects of the invention. While the invention has been shown and described with respect to a particular embodiment, it will be understood by those of skill in the art that various changes in form and detail may be made therein without departing from the spirit and scope of the invention.

What is claimed is:

1. An adjusting assembly for selectively adjusting a preload on a bearing assembly, said adjusting assembly being adapted to be interposed between a bearing assembly and a retaining means for said bearing assembly, said adjusting assembly comprising:

a bearing cup body having a first threaded portion and an engaging portion adapted to abut an outer race of said bearing assembly;

an adjusting ring having a main body portion and a second threaded portion threadingly engaging said first threaded portion, said adjusting ring being adapted to be interposed between said bearing assembly and said retaining means such that rotation of said second ring means effects axial translation of said first and second ring means.

2. The adjusting assembly of claim 1, wherein said bearing cup body is sized to fit within a bearing recess formed in a differential carrier.

3. The adjusting assembly of claim 2, wherein said adjusting ring is interposed between said bearing cup body and a stationary wall formed on said differential carrier.

4. The adjusting assembly of claim 2, further comprising a bearing cap disposed within said differential carrier to lock said adjusting ring in fixed position relative to said bearing cup body.

5. The adjusting assembly of claim 1, wherein said engaging portion of said bearing cup body defines a cup-shaped recess in said bearing cup body, said cup-shaped recess adapted to receive a portion of said bearing assembly therein during adjustment of said preload.

6. The adjusting assembly of claim 1, wherein said main body portion of said adjusting ring has a smaller circumference than said bearing cup body to permit rotation of said adjusting ring relative to said bearing cup body.

7. The adjusting assembly of claim 1, wherein said main body portion comprises crenations disposed on an outer circumference to engage a locking member securing said adjusting ring in a fixed position.

8. The adjusting assembly of claim 1, further comprising a locking member securing said adjusting ring in fixed position relative to said bearing cup body, wherein said locking member is chosen from the group consisting or a bearing cap, at least one bolt, a locking pin, and adhesive disposed on said adjusting ring.

* * * * *